United States Patent [19]

LeBlanc et al.

[11] 4,298,589
[45] Nov. 3, 1981

[54] SPLIT AXIAL FLOW CONVERTER IN AMMONIA SYNTHESIS

[75] Inventors: Joseph R. LeBlanc; Robert B. Peterson, both of Houston, Tex.

[73] Assignee: The M. W. Kellogg Company, Houston, Tex.

[21] Appl. No.: 160,358

[22] Filed: Jun. 17, 1980

[51] Int. Cl.³ .............................................. C01C 1/04
[52] U.S. Cl. .................................. 423/359; 422/148; 423/361
[58] Field of Search ............... 423/359, 360, 361, 362, 423/363; 422/148

[56] References Cited

U.S. PATENT DOCUMENTS

| | | | |
|---|---|---|---|
| 1,909,378 | 5/1933 | Richardson | 423/360 |
| 1,910,365 | 5/1933 | Richardson | 423/360 |
| 3,459,511 | 8/1969 | Jotoku et al. | 422/148 |
| 3,694,169 | 9/1972 | Fawcett et al. | 423/360 |
| 4,148,866 | 4/1979 | Becker | 423/359 |

Primary Examiner—O. R. Vertiz
Assistant Examiner—Wayne A. Langel
Attorney, Agent, or Firm—Kurt S. Myers; C. W. Crady

[57] ABSTRACT

The present invention is directed to an improved synthesis process and system for the production of ammonia. More specifically, the present invention involves the use of a split axial flow converter in the low pressure synthesis of ammonia.

2 Claims, 4 Drawing Figures

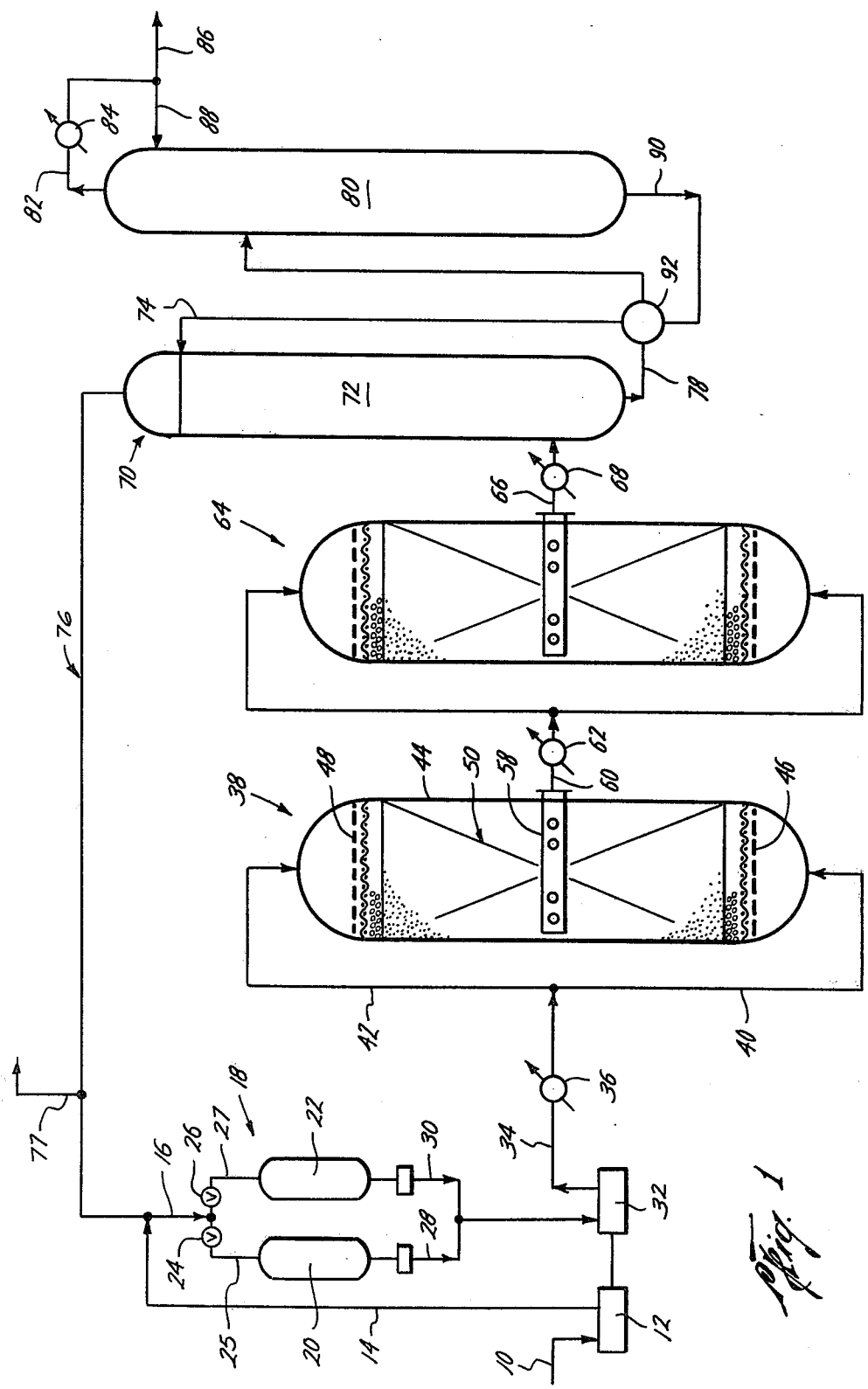

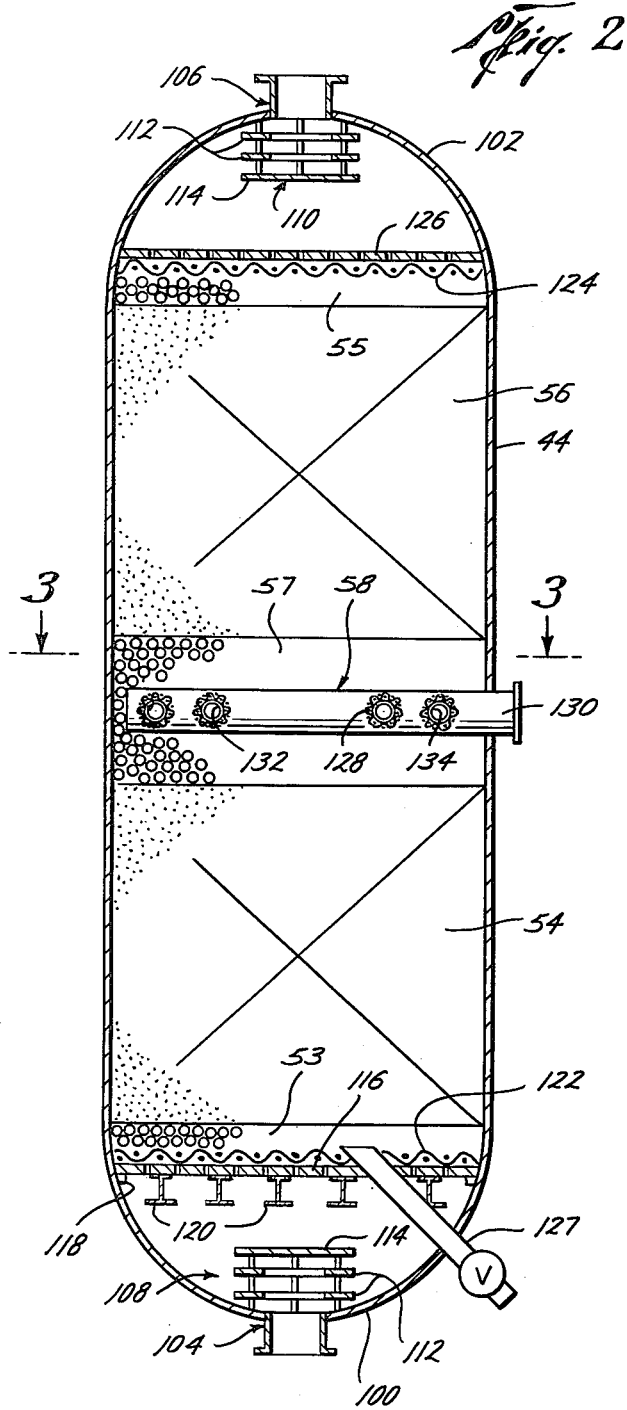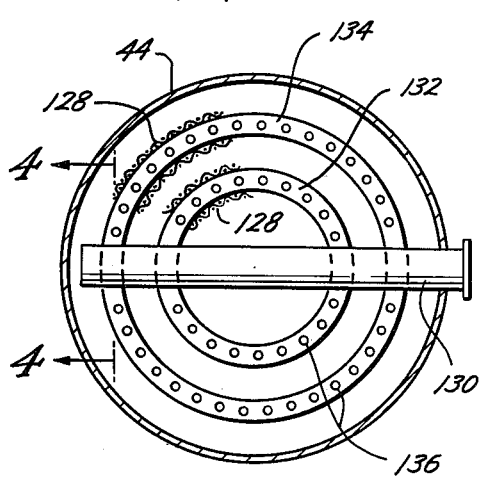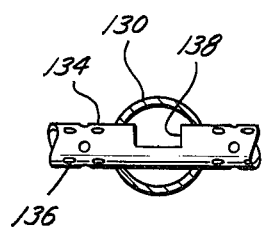

SPLIT AXIAL FLOW CONVERTER IN AMMONIA SYNTHESIS

BACKGROUND ART

U.S. Pat. No. 4,148,866 discloses an improved synthesis loop for the production of ammonia which has a synthesis pressure of less than 100 atmospheres, a water absorption recovery system which utilizes low level heat recovered from the process for producing the synthesis gas to distill the ammonia-water mixture and an ammonia absorption refrigeration system.

U.S. Pat. No. 3,694,169 discloses a reactor for synthesising ammonia which comprises a pressure-resisting shell, a catalyst bed of annular section and a short axial heat exchanger. The reactant gas flows through the catalyst bed convergently towards an outlet near one end of the heat exchanger.

SUMMARY OF THE INVENTION

The present invention is directed to an improvement in a low pressure ammonia synthesis process. More particularly, the ammonia synthesis system of the present invention is characterized by a simplified split axial flow ammonia converter design and a synthesis pressure in the range of 45 to 80 atmospheres.

BRIEF DESCRIPTION OF THE DRAWINGS

FIG. 1 is a flow diagram of an ammonia synthesis loop utilizing the system of the present invention;

FIG. 2 is a schematic diagram of a split axial flow ammonia converter;

FIG. 3 is a cross-sectional view along 3—3 of FIG. 2 showing details of the outlet collector of the split axial flow ammonia converter; and FIG. 4 is a cross-sectional view along 4—4 of FIG. 3 showing a configuration of the collector rings in the outlet pipe of the outlet collector.

DETAILED DESCRIPTION OF THE PREFERRED EMBODIMENTS

The present invention is directed to an ammonia synthesis system which uses a split axial flow ammonia converter. According to the present invention, a low energy ammonia process can be obtained with a significantly simplified ammonia converter design.

The reaction involved in the process for producing ammonia is:

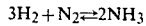

$$3H_2 + N_2 \rightleftharpoons 2NH_3 \qquad (1)$$

The reaction is an exothermic catalytic reaction which takes place in an ammonia synthesis converter containing an ammonia synthesis catalyst, usually an iron or promoted iron catalyst. Since the reaction (1) is not complete, the desired ammonia is recovered and the unreacted hydrogen and nitrogen are recycled. The unit operational steps of combining the fresh synthesis gas and the recycled gas, passing the combined gases through the ammonia synthesis converter, the recovery of the ammonia from the unreacted gases and the recycle of the unreacted gases is referred to as an ammonia synthesis system or loop.

The fresh synthesis gas is a mixture of hydrogen and nitrogen, usually containing three mols of hydrogen for each mol of nitrogen, and may be prepared from any of the manners known to the art. Conventional methods may require some compression to provide the fresh synthesis gas at a pressure suitable for mixing with the recycled unreacted hydrogen and nitrogen in the ammonia synthesis system.

The ammonia synthesis system according to the present invention preferably comprises a makeup/recirculating compressor for compressing the mixed fresh synthesis gas and recycle gas to a synthesis pressure in the range of 45 to 80 atmospheres, a pair of split axial flow converters, and an ammonia recovery system which recovers the ammonia and recycles the unreacted hydrogen and nitrogen. In the preferred embodiment, the ammonia is recovered by scrubbing the product gas from the ammonia synthesis converter with water. The unreacted hydrogen and nitrogen from the ammonia-water absorption system are recycled after purge, as necessary, and combined with the fresh synthesis gas. The combined gases are dried, preferably by passing through molecular sieves which will remove water before being introduced to the recirculating compressor.

Referring to FIG. 1, a specific embodiment of the ammonia synthesis system is illustrated. A fresh ammonia synthesis gas, which may be produced by one of the common commercial processes such as disclosed in U.S. Pat. No. 4,148,866, is introduced by line 10 to a compressor 12 where the gas is compressed to the synthesis system or loop pressure and introduced to the system by line 14. The fresh synthesis gas is mixed with the recycled gas in line 16. The combined gases are passed through a drier 18. The drier 18 comprises at least two vessels 20 and 22 which contain a molecular sieve adaptable to remove water. Valve 24 in line 25 is open to permit the combined gases to pass through vessel 20 while valve 26 in line 27 is closed. Thus while one vessel 20 operates in the adsorption cycle, the other vessel 22 undergoes desorption by heating, cooling and standby for use in the total drying cycle. More than two vessels may be employed in the drying cycle. The dried gases are passed out of vessels 20 or 22 by lines 28 or 30 respectively to a recirculating compressor 32.

The recirculating compressor 32 and compressor 12 may be separate stages of a single compressor. The recirculating compressor 32 or final stage compresses the dried combined gases to a synthesis pressure in the range of 45 to 80 atmospheres. A preferred range of pressure is between 50 and 70 atmospheres. The compressed gases are passed from recirculating compressor 32 through line 34 containing an exchanger 36 wherein the gases are heated to reaction temperature.

The ammonia synthesis gas is then introduced to the simplified split axial flow ammonia converter 38. The design of the converter 38 is such that substantially equal volumes of the synthesis gas enter line 40 and 42 respectively. Lines 40 and 42 are of substantially equal piping lengths and sizes for supplying the two streams to the vessel 44, line 40 introducing one stream to the bottom of the vessel 44 while line 42 introduces the other stream to the top of the vessel 44. Within vessel 44 there is a lower support 46 and an upper restraining 48, both of which will be more specifically described hereinafter. Between the lower support 46 and upper restraining means 48 is a continuous bed 50. The bed 50 may be a continuous bed of ammonia synthesis catalyst. In FIG. 2, a preferred continuous bed 50 is comprised of a lower bed 54 and an upper bed 56 of substantially equal volume of ammonia synthesis catalyst, a layer 53 of inert material above support means 46 which supports lower bed 54, a layer 55 of inert material on top of upper bed 56 and below restraining means 48 and a mid-section layer 57 of inert material between lower bed 54 and upper bed 56. The layers 53, 55 and 57 of inert material are of larger particle size than the catalyst to prevent plugging and minimize pressure drop. The inert material is used to prevent the direct impingement of synthesis gas on the catalyst; however, the use of layers of larger particle size catalyst may also be used. At the mid section of bed 50 and the vessel 44 is a collector means 58 for removing the product gases. The details of collector means 58 will be more specifically described hereinafter.

The product gas from the collector means 58 of ammonia converter 38 is passed through line 60 containing an exchanger 62 wherein the product gases are cooled and introduced into a second ammonia converter 64. The second converter is preferably a second split axial flow ammonia converter having the same characterisitics as converter 38, accordingly, these details will not be repeated. The product gas from converter 64 is passed through line 66 containing an exchanger 68 wherein the product gases are cooled and introduced to an ammonia recovery system 70 which recovers the ammonia and recycles the unreacted hydrogen and nitrogen. Specifically, a water scrubbing system 72 may be used wherein the product gas introduced by line 66 is intimately contacted with water introduced by line 74 whereby the ammonia is absorbed by the water while generating considerable heat of absorption. In general, the water scrubbing system 72 may be an absorption system using vertical wetted wall exchanger absorption, multistage packed/trayed tower absorption, concurrent multistage heat exchange absorption or a trayed column with heat transfer area on each tray. The unreacted hydrogen and nitrogen are removed from the top of the water scrubbing system 72 by line 76 for recycling and, after purging, through line 77, mixing with the fresh synthesis gas in line 16.

The ammonia-mixture formed in the water scrubbing system 72 is removed by line 78 to a distillation column 80. In distillation column 80, the ammonia-water mixture is distilled to recover anhydrous ammonia overhead in line 82 which may be condensed in exchanger 84 before recovery through line 86 or reintroducing a portion by line 88 into distillation column 80. The distillation may be carried out as described in U.S. Ser. No. 4,148,866 and the ammonia recovered at atmospheric pressure by using the ammonia absorption system disclosed in U.S. Pat. No. 4,153,673. The water is removed from the bottom of the distillation column 80 by line 90 wherein the water is cooled in exchanger 92 by the ammonia-water mixture passing to the distillation column 80.

Referring to FIGS. 2, 3 and 4, split axial flow converter (38 or 64) of the present invention is illustrated in more detail. With specific reference to converter 38, the vessel 44 comprises a bottom head 100 and a top head 102, both of which may be hemispherical. An inlet means 104 is in bottom head 100 and an inlet means 106 is in top head 102. Inlet means 104 and 106 may both be designed as manholes such that a man can enter vessel 44, otherwise a manhole (not shown) is provided in one or both heads 100 and 102, and are adapted to connect to inlet lines 40 and 42, respectively. The inlet means 104 and 106 serve not only as connectors to inlet lines 40 and 42 but as distributors to the incoming gases. Inlet means 104 includes a distributor 108 and inlet means 106 includes a distributor 110. Distributor 108 and 110 may be comprised of a series of ring-shaped baffles 112 and a solid circular baffle 114 connected to head 100 and 102, respectively.

A lower support means 46 is positioned within lower head 100 to support bed 50. Lower support means 46 comprises a support grating 116 which may be supported by a ring 118 and beams 120 connected to head 100. A screen 122 covers the grating 116. The continuous bed 50 extends upward from the screen 122 of lower support means 46. Preferably, the continuous bed 50 is a lower bed 54 and an upper bed 56 of ammonia synthesis catalyst with layers 53, 55 and 57 of inert balls, e.g., ½-1" alumina balls having a quality to withstand the high temperatures and having minimum impurities. A high quality alumina ball may be specified as 94% minimum $Al_2O_3$ and 0.2% maximum $SiO_2$. The vessel 44 is easily filled by introducing the inert balls and catalyst sequentially in predetermined amounts. The layer 53 and 55 of inert balls may extend between 6 and 18 inches in depth and likewise extend above and below collector means 58 about the same depth. The upper restraining means 48 maintains the bed 50 in a fixed position within vessel 44. Upper restraining means 48 comprises a screen 124 and a grating 126 which may be fixed to upper head 102. The inert balls are used to prevent the screens 122 and 124 from plugging. The continuous bed 50 extends to the wall of vessel 44 and the gases are uniformly distributed throughout the cross-sectional area of vessel 44. The vessel 44 may be easily emptied by opening discharge pipe(s) 127.

The ammonia synthesis catalyst making up the continuous bed 50 or lower bed 54 and upper bed 56 is preferably iron or promoted iron catalysts which are commercially available. Details of ammonia synthesis catalyst and ammonia operations are set forth in Ammonia, Part III, edited by A. V. Slack and G. Russell James, 1977, Marcel Dekker, Inc., New York. When catalyst is used to make up the entire continuous 50, a larger particle size would be used in layers 53, 55 and 57 so as to prevent screens 122 and 124 plugging as well as screen 128 which surrounds collector means 58 which removes the product gases from the vessel 44.

Referring to FIG. 3, the collector means 58 comprises an outlet pipe 130 and two concentric collector rings, inner ring 132 and outer ring 134. Both inner rings 132 and outer ring 134 are pipes perforated by holes 136 around the entire periphery. Each of ring 132 and ring 134 pass through the outlet pipe 130 and as shown in FIG. 4 have a slot 138 cut in the pipe internal of outlet pipe 130. Each of rings 132 and 134 of the collector means 58 may be covered by a wire screen 128 to prevent the holes 136 from becoming clogged.

The ammonia synthesis system of the present invention utilizes a synthesis pressure in the range of 45 to 80 atmospheres. This range of pressures is significantly lower than pressures presently commercially employed (i.e. in excess of 130 atmospheres). With the lower pressure and water recovery, an energy efficient system is obtained. The main advantage of the split axial flow converter of the present invention is the simple and less expensive construction. The construction eliminates the vessel within a vessel design of the prior art. Further, the converter provides a design for large volumes of catalyst without costly heat removal systems while maintaining low pressure drops within the converter.

The nature and objects of the present invention having been completely described and illustrated and the best mode thereof set forth.

What we wish to claim as new and useful and secure by Letters Patent is:

1. A process for the production of ammonia which comprises:

compressing an ammonia synthesis gas containing $H_2$ and $N_2$ to a pressure of between 45 and 80 atmospheres;

introducing said ammonia synthesis gas in two equal streams to an ammonia converter, one stream of said ammonia synthesis gas introduced to the bottom of said converter and the other stream of said ammonia synthesis gas introduced to the top of said converter, each stream passing through a substantially equal bed of ammonia synthesis catalyst which extends to the outer wall of said converter;

reacting said $H_2$ and $N_2$ in said catalyst bed at a pressure less than 80 atmospheres to form a product gas containing ammonia, $H_2$ and $N_2$; and removing said product gas from the middle portion of said converter.

2. A process according to claim 1 which further includes:

introducing said product gas in two equal streams to a second ammonia converter, one stream of said product gas introduced to the bottom of said second converter and the other stream of said product gas introduced to the top of said second converter, each stream passing through a substantially equal bed of ammonia synthesis catalyst which extends to the outer wall of said second converter;

reacting said $H_2$ and $N_2$ in said second catalyst bed at a pressure less than 80 atmospheres to form a second product gas; and removing said second product gas from the middle portion of said second ammonia converter.

* * * * *